United States Patent [19]

Klomp

[11] 4,286,557

[45] Sep. 1, 1981

[54] TARGET INJECTION STRATIFIED CHARGE SPARK IGNITION ENGINE

[75] Inventor: Edward D. Klomp, Mt. Clemens, Mich.

[73] Assignee: General Motors Corporation, Detroit, Mich.

[21] Appl. No.: 77,842

[22] Filed: Sep. 21, 1979

[51] Int. Cl.³ .............................................. F02B 17/00
[52] U.S. Cl. .................... 123/298; 123/261; 123/276; 123/295
[58] Field of Search ............... 123/261, 276, 279, 294, 123/295, 298, 305, 280, 430, 431, 193 P

[56] References Cited

U.S. PATENT DOCUMENTS

| | | | |
|---|---|---|---|
| 1,708,056 | 4/1929 | French | 123/279 |
| 3,035,559 | 5/1962 | Brandes et al. | 123/32 |
| 3,094,974 | 6/1963 | Barber | 123/261 |
| 3,132,633 | 5/1964 | Zimmerman | 123/276 |
| 3,400,701 | 9/1968 | Tessmer | 123/193 P |
| 3,498,276 | 3/1970 | Hardenberg | 123/261 |
| 3,999,532 | 12/1976 | Kornhauser | 123/325 P |
| 4,014,300 | 3/1977 | Klomp | 123/30 C |
| 4,018,193 | 4/1977 | Klomp | 123/30 C |
| 4,119,064 | 10/1978 | Klomp | 123/30 C |

*Primary Examiner*—Charles J. Myhre
*Assistant Examiner*—Andrew M. Dolinar
*Attorney, Agent, or Firm*—Robert J. Outland

[57] ABSTRACT

A stratified charge spark ignition internal combustion engine is arranged to provide a preferably centered target recess on the end of the piston to redirect fuel spray injected against the recess back into the central portion of the combustion chamber to form a centralized relatively rich core or mixture cloud surrounded by an annular body of air. The size of the centered mixture cloud is load variable as determined by the volume and timing of injection as well as other factors. A preferred embodiment includes a target shape which compensates for limited eccentricity and angularity of the nominally axial injection spray to maintain a relatively even distribution of fuel within the mixture cloud. An alternative arrangement also includes a small ignition antechamber surrounding the end of the injection nozzle.

3 Claims, 5 Drawing Figures

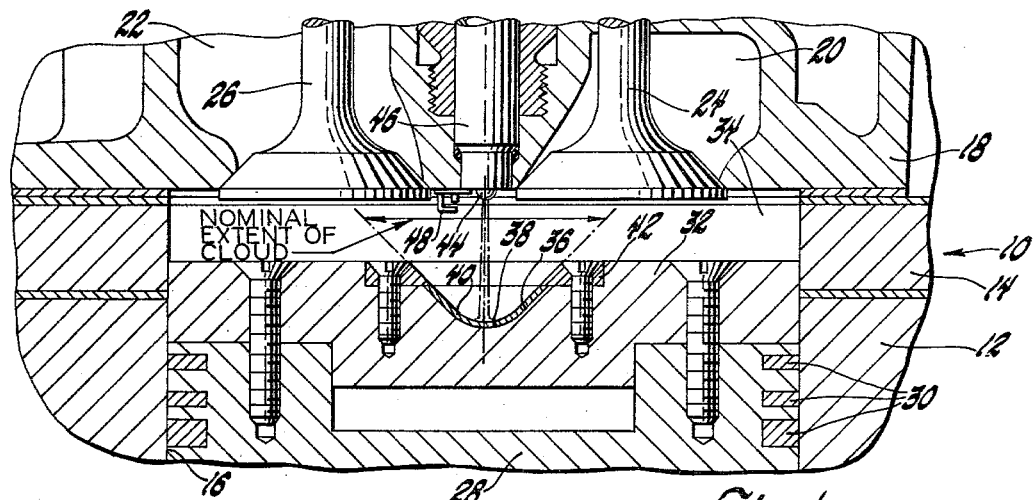
Fig. 1
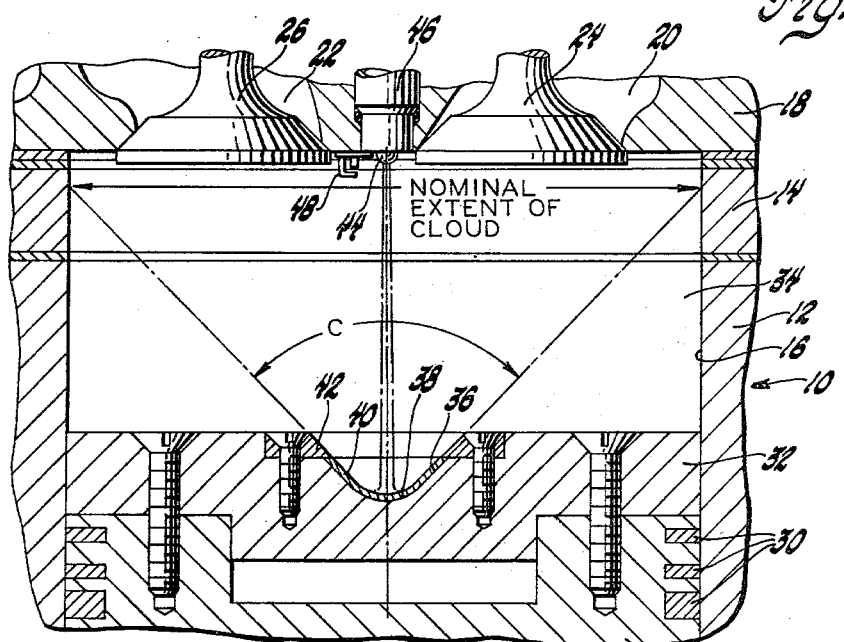
Fig. 2
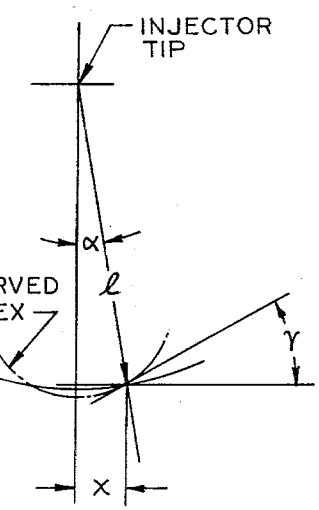
Fig. 3
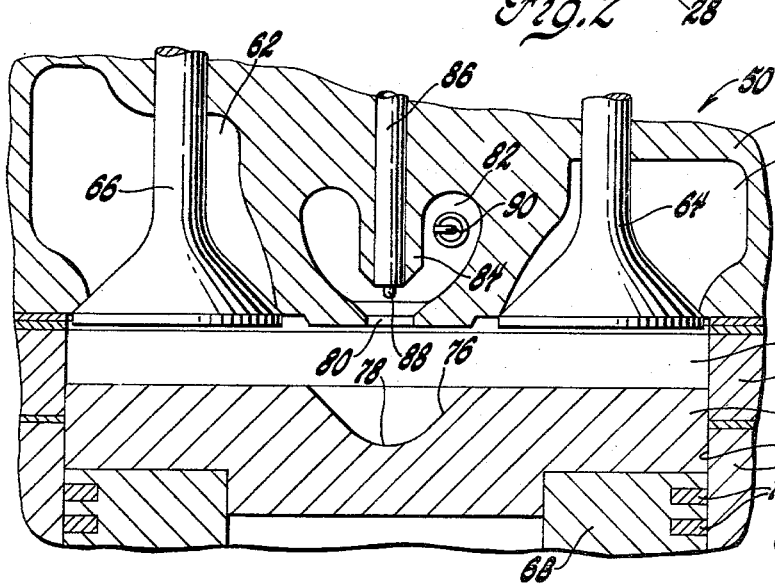
Fig. 5
Fig. 4

TARGET INJECTION STRATIFIED CHARGE SPARK IGNITION ENGINE

TECHNICAL FIELD

This invention relates to spark ignition internal combustion engines of the stratified charge type. In its more particular aspects, the invention relates to an engine combustion chamber arrangement in which is developed a centralized cloud of air-fuel mixture with a surrounding annulus of unmixed air developed through a novel target injection fuel delivery concept.

BACKGROUND OF THE INVENTION

For many years it has been theorized that stratification of the charge in an internal combustion engine combustion chamber has the potential for providing more positive ignition and more complete combustion of air-fuel mixtures than use of a homogeneous charge arrangement, thus yielding the possibility of both improved engine efficiency and reduced emissions of unburned combustibles with stratified charge. Proposed combustion chamber arrangements have taken many forms, including what I have called rich-core stratified charge arrangements in which each combustion chamber is provided with a preferably swirling charge having a central core of relatively fuel-rich mixture (which may be leaner than stoichiometric) and a surrounding peripheral portion composed primarily of air or leaner mixture. Examples of such arrangements are found in my prior U.S. Pat. Nos. 4,014,300 granted Mar. 29, 1977, 4,018,193 granted Apr. 19, 1977, and 4,119,064 granted Oct. 10, 1978, all of which are assigned to the assignee of the present invention.

SUMMARY OF THE INVENTION

The arrangements of the present invention, which I call target ignition stratified charge or TISC, involve a unique method for forming the desired relatively rich core or cloud of air-fuel mixture in the central portion of the combustion chamber. In these arrangements, a fuel injector, preferably centered in the end of the cylinder, sprays a jet of fuel onto a target, preferably centered with the head of the piston. The target is preferably of generally conical shape with a part-spherical or curved apex, so arranged as to redirect the fuel spray into a cone extending upwardly from the central portion of the piston into the combustion chamber. The shape of the cone, as well as the timing and velocity of injection and other factors, provide for varying the size of the mixture cloud formed in the combustion chamber as a function of engine load so that the advantages of rich-core ignition and combustion are available over the full power range of the engine.

Various embodiments of my invention feature the provision of a calculated curvature at the apex of the conical target recess, which is adapted to correct for misalignment of the injection fuel spray from the nominal position preferably on the cylinder axis. An addition optional feature is the provision of a small ignition chamber in the end of the cylinder surrounding the fuel injection nozzle spray tip.

In the TISC concept, as embodied in my invention, the target design controls the flow direction of the fuel sheet leaving the target and thereby influences the shape of the fuel cloud, the amount of fuel-air mixing and the degree of load control. The high velocity fuel jet will entrain air and should provide a well mixed combustible fuel cloud without major disturbances to the surrounding air which is not seeded with fuel. Use of a high velocity jet may generate high turbulence levels in the cloud with improved combustion efficiency. The provision of swirl in the main body of air in the engine cylinder may be desirable to maintain the rich fuel-air core intact and improve the repeatability of mixture formation so as to approach the ideal stratified charge in which a homogeneous mixture is surrounded by a curtain of pure air.

These and other features and advantages of the invention will be more fully comprehended from the following description of certain specific embodiments taken together with the accompanying drawing.

BRIEF DESCRIPTION OF THE DRAWING

In the drawing:

FIG. 1 is a fragmentary cross-sectional view of a portion of an internal combustion engine formed in accordance with the invention and showing the configuration of a combustion chamber and its surrounding elements and indicating the timing of injection and extent of mixture cloud formation under light load operation;

FIG. 2 is a cross-sectional view similar to FIG. 1 indicating the earlier injection timing and larger extent of mixture cloud developed under heavy load operation;

FIGS. 3 and 4 are diagrammatic views illustrating the essential dimensions for characterizing the shape required of the part-spherical target apex to provide for correction of angular and eccentric misalignment of the fuel injection spray; and FIG. 5 is a fragmentary cross-sectional view similar to FIGS. 1 and 2 but showing an alternative embodiment of the invention.

BEST MODE FOR CARRYING OUT THE INVENTION

Referring now to the drawings in detail, there is shown in FIGS. 1 and 2 a spark ignition internal combustion engine generally indicated by numeral 10. Engine 10, while generally similar to conventional engines, includes certain elements provided specifically for test purposes which would be eliminated or combined with other components in a commercial embodiment.

Thus the engine includes the usual cylinder block 12 having sealingly secured thereto a spacer plate 14, the thickness of which is selected to provide the desired piston clearance and compression ratio for operation of the engine with various test components. The cylinder block and spacer plate together define one or more cylinders 16. The ends of the cylinders are conventionally closed by a cylinder head 18 sealingly mounted on the spacer plate 14 and including the usual intake and exhaust ports 20, 22, the opening of which is controlled in conventional manner by intake and exhaust poppet valves 24, 26 respectively.

Within each cylinder 16, there is reciprocably mounted a piston 28 having the usual piston sealing rings 30. The piston also includes a separate cap member 32 mounted on the piston end in opposed relation to the cylinder head and defining with the head and cylinder a variable volume combustion chamber 34.

Centrally disposed at the end of the piston in the cap member is a conically sided recess 36 having an axis which is preferably coincident with the cylinder axis and formed with a curved apex 38. In the illustrated construction, the combustion chamber-exposed surface of the recess is formed in part by a small sheet metal insert 40 that is retained in place by an annular retaining ring 42 suitably secured to the cap member.

The rounded apex conical recess is positioned opposite the spray tip 44 of a fuel injection nozzle 46 that is mounted in the cylinder head, preferably on the axis of the cylinder. The injection nozzle is arranged to spray a solid high pressure jet of fuel directly along the cylinder axis and against the center of the curved apex 38 of the recess 36. A spark plug 48 is disposed in the cylinder head with its spark gap located near the central portion of the combustion chamber.

In operation of the engine embodiment as so far described, the fuel spray volume and timing are varied in accordance with engine load to provide a central rich core or cloud of fuel-air mixture within the engine cylinder, surrounded by an annulus of relatively fuel free air. Preferably, the air-fuel mixture within the cloud is leaner than stoichiometric so that adequate air is present to burn all the fuel without mixing the free air in the surrounding annulus. This may be varied, however.

FIG. 1 illustrates the timing of injection for the engine during operation under light load. The piston 28 has moved upwardly on its compression stroke to a point approaching, but short of, its maximum upward travel. Beginning about this point, a relatively small charge of fuel is sprayed in a solid high pressure jet against the center of the target recess 36 in the piston. Impingement of the fuel against the recess causes it to spread outwardly along the recess surface and upward in a generally conical shape back toward the cylinder head, mixing with the air in the central core and vaporizing as it moves upwardly. In this way a relatively small core of air-fuel mixture is formed around the central axis of the cylinder surrounded by a relatively larger annulus of previously inducted free air.

Upon further movement of the piston to approximately its top dead center position, the core of relatively rich mixture in the center of the cylinder is ignited by the spark plug 48. The spark plug is located, preferably in the cylinder head, with its spark gap disposed within the central core zone for positive ignition of the air-fuel mixture therein. The result is the rapid ignition and burning of the mixture in the relatively rich core with resulting expansion.

FIG. 2 is somewhat similar to FIG. 1 but illustrates the timing of injection for the engine during operation under heavy load. It will be noted that the piston, moving upward on its compression stroke, is at a point much further in advance of its top dead center position than as shown in FIG. 1. Beginning about this point, a nearly full charge of fuel in a high pressure jet is sprayed by the injector against the center of the piston target recess 36. The recess again redirects the injected fuel into an upwardly and outwardly extending conical sheet which entrains air and vaporizes, forming a large mixture cloud which extends from the lower central portion of the combustion chamber nearly to its upper edges as indicated in the figure. Upon further upward movement of the piston to near its top dead center position and additional mixing of the fuel-air mixture with the adjacent smaller body of free air, the mixture is ignited by the spark plug and burns rapidly in the manner previously described.

From the above, it may be seen that the invention provides for operation under all engine power conditions from light load to full load with the extent of the mixture cloud formed within the cylinder being determined by the volume and timing of the injection of fuel to accomplish the desired purposes. It should be apparent that the included cone angle C, illustrated in FIG. 2, is an important determinant of the relationship between injection timing and the radial extent of the mixture cloud. Further, it should be recognized that radial penetration of the spray will also be influenced by such factors as injection pressure, injector orifice diameter, injection duration and fuel characteristics. The use of the thin sheet metal insert 40 as the target surface is suggested as of possible advantage in increasing the temperature of the target wall so as to enhance fuel vaporization.

In development of the present invention, I have recognized that a perfectly symmetrical target operating with a perfectly aligned spray should provide a perfectly uniform circumferential distribution of the fuel leaving the target within the combustion chamber. The resulting air-fuel mixture cloud may then approach perfect symmetry, which is a desirable feature for this stratification concept. Unfortunately, perfect symmetry and perfect alignment do not exist in practice. In our experience, it is not unusual for a spray to deviate from the desired path to an extent that would result in significant fuel maldistribution, unless this is avoided by proper shaping of the target. There are various ways in which such shaping may be accomplished and it should be understood that the present invention is not limited to the use of conical or near conical target shapes, although such arrangements are preferred as present.

I have determined that with the preferred conical target arrangement, a curved apex can be formed in a manner to compensate for reasonable eccentric and angular misalignment of the injector fuel spray so as to offset, at least in part, the maldistribution of fuel in the mixture cloud which would otherwise result. FIGS. 3 and 4 in the drawing illustrate the important dimensional relationships of the subsequently presented formula defining this curved apex.

In these views "r" is the radius of the target recess while "x" represents the amount of fuel spray eccentricity for which correction is desired. In FIG. 4, "$\alpha$" represents the angle of misalignment of the fuel spray from the cylinder axis for which correction is desired. "l" is the distance from the injector spray tip to the point of impingement of the fuel spray on the surface of the piston recess at the point of maximum or calculated deviation. "$\gamma$" represents the angle of the surface of the recess relative to a plane normal to the central axis which is required to provide the desired correction at the point of eccentric angular impingement. The angle "$\gamma$" may be determined for any desired condition of eccentricity in accordance with the following formula:

$$\gamma = \alpha + \arcsin\left(\frac{1}{1 - \frac{l}{r}\sin\alpha} - 1\right)$$

Thus by curving the surface of the recess apex in accordance with this formula, the nonperpendicular impingement will tend to compensate for the angularity and eccentricity of the spray jet.

It should be noted that if compensation is made exact in the plane of maximum deviation, it can only be partial in any other plane. This occurs both because of the differing requirements of correction for angular and eccentric misalignment as well as because of the differing positions of the piston during injection under varying load conditions. Nevertheless, formation of the recess apex in accordance with the principles indicated is effective to improve the distribution of fuel spray under all load conditions.

Referring now to FIG. 5 of the drawing, there is illustrated an alternative embodiment of target injection stratified charge (TISC) spark ignition engine formed in accordance with the invention and generally indicated by numeral 50. The main components of the engine 50 are similar to those in the engine 10 of FIGS. 1 and 2 including the cylinder block 52, spacer plate 54, cylinder 56, cylinder head 58, the intake and exhaust ports 60, 62 with their respective poppet valves 64, 66, piston 68 with its piston ring 70 and cap member 72, the combustion chamber 74 and the conical target recess 76 with its curved apex 78.

The engine 50 differs in that opposite the target recess 76, the cylinder head 58 is provided with an orifice 80 which leads into an annular ignition chamber recess 82 surrounding a projection 84 in which the injection nozzle 86 is mounted. The spray tip 88 of the injection nozzle extends into the center of the recess 82 immediately above the orifice 80 so that the jet of fuel spray may be directed through the orifice directly into the center of the apex 78 of the piston recess 76. A spark plug 90 extends within the recess 82 above the location of the injector nozzle spray tip 88.

In operation, the injector 86, 88 spraysa fuel jet at the center of the target recess 76 which spreads and returns the fuel to the center of the combustion chamber forming a rich central cloud in the manner described with respect to the first embodiment. Since injection occurs while the piston is moving upward, there is a concurrent flow of air from the cylinder through orifice 80 into the annular ignition chamber recess 82, which picks up some of the fuel spray from the injection nozzle jet and carries it with the air into the ignition chamber recess. Thus, when the piston approaches its top dead center position and the spark plug is fired, an ignitible fuel-air mixture is present in the ignition chamber, permitting positive ignition to occur under all operating conditions. Burning of the mixture in the ignition chamber then forces a jet of burning fuel out through the orifice 80 to ignite the air-fuel cloud in the main chamber and combustion then proceeds in the manner previously described.

While the invention has been described by reference to certain preferred embodiments, chosen for purposes of illustration, it should be understood that numerous changes could be made within the spirit and scope of the inventive concepts disclosed. Accordingly, it is intended that the invention not be limited to the illustrated embodiments but that it have the full scope permitted by the language of the following claims.

These embodiments of the invention in which an exclusive property or privilege is claimed are defined as follows:

1. A stratified charge spark ignition internal combustion engine having at least one closed end cylinder with a piston reciprocable therein, the piston having a closed end wall opposing and defining with the cylinder closed end a variable volume combustion chamber, intake and exhaust means connecting with the combustion chamber, a fuel injection nozzle carried in the closed end of the cylinder and arranged to spray a jet of fuel against the piston closed end near the cylinder central axis, and a target recess at the piston end wall and forming a surface of revolution about an axis nominally aligned with the fuel spray jet, said target recess being configured to receive the fuel jet centrally thereof and to spread and redirect the fuel around and away from the axis in a spray generally centered within the combustion chamber to form a richcore stratified fuel-air charge upon mixture with an air charge in the chamber, and a spark plug disposed in the combustion chamber within the rich core zone of the stratified charge.

2. The combination of claim 1 wherein said target recess has a generally conical shape with a curved apex portion, said apex portion being configured to at least partly offset the effect of minor misalignment of the fuel spray jet and the target axis to provide relatively even peripheral distribution of the sprayed fuel in the rich core zone within a limited predetermined range of spray jet misalignment.

3. The combination of claim 2 wherein the target recess apex portion is configured in accordancce with the formula:

$$\gamma = \alpha + \arcsin\left(\frac{1}{1 - \frac{l}{r}\sin\alpha} - 1\right)$$

where
$\gamma$ = local wall angle from plane normal to axis at any point of eccentric spray impingement;
$\alpha$ = angle of jet misalignment with axis;
$l$ = distance from nozzle to compensation annulus (point of impingement);
$r$ = target radius.

* * * * *